3,031,436
OMEGA-CYANOTHIAALKYL ACRYLATE
POLYMERS
Julianne H. Prager, Roseville, and Richard M. McCurdy, St. Paul, Minn., assignors to Minnesota Mining & Manufacturing Company, St. Paul, Minn., a corporation of Delaware
No Drawing. Filed Mar. 1, 1956, Ser. No. 568,695
7 Claims. (Cl. 260—79.7)

The present invention relates to a novel class of ethylenically unsaturated compounds and to polymer products thereof. In particular, our invention relates to a series of highly useful monomeric omega-cyanothiaalkyl acrylates, to certain methods by which these compounds are prepared and to unique rubbery homo- and co-polymer products of omega-cyanothiaalkyl acrylates. The structure of these acrylates is typified by that of a preferred embodiment, 5-cyano-3-thiapentyl acrylate, having the formula

The polymer products, particularly the homopolymer products, of certain of our novel omega-cyanothiaalkyl acrylates are of a rubbery nature having highly desirable characteristics. These products are soft and pliable over wide temperature ranges including low temperatures. Resistance to solvents is extremely high. They are stable, in many instances substantially odorless and are readily cured or vulcanized. These remarkably seldom attained combinations of properties render our polymer products highly suited to a variety of applications. For example, the cured or vulcanized products hereof may be molded in the form of excellent gasketing, packing, hoses and the like for use in the automotive and aircraft industries, where working temperature ranges are wide and the presence of highly active solvents is prevalent. The uncured or unvulcanized rubbery homopolymers are advantageously employed in the preparation of highly solvent resistant adhesive compositions and pressure-sensitive adhesive compositions such as are used in pressure-sensitive adhesive tapes.

The monomeric products of the present invention, which are, as a rule, high boiling, clear, colorless and substantially odorless liquids, are also highly useful. Certain of the monomers, of course, are employed as intermediate compounds in the preparation of the aforementioned homopolymer products hereof. These monomers may also be polymerized with other monomeric constituents, which of themselves form homopolymers having only mediocre or poor low temperature flexibility and solvent resistance, to provide copolymers having vastly improved solvent resistance and low temperature flexibility. For example they may be copolymerized with acrylic acid, alkyl acrylates, e.g. butyl acrylate and ethyl acrylate, vinyl chloride, and other olefinic polymerizable constituents. Apart from the preparation of polymer products, however, all of our omega-cyanothiaalkyl acrylate monomers exhibit useful germicidal and insecticidal properties and are employed with advantage in various fields of agriculture.

Polymerization of the resulting monomeric compounds is carried out by any of several procedures well known to the art. Mass, solution, or emulsion techniques may be employed, the latter procedure being considered preferable. Generally, this method includes agitating the monomer in the presence of water, a suitable polymerization initiator and, preferably, a suitable stabilizer. The temperature of polymerization may be maintained between about 0° C. and 100° C., the rate of polymerization being somewhat faster at the higher temperatures. Preferably, however, the temperature is maintained within the range of about 20° C. and 60° C. Modifiers, such as mercaptans, and reducing agents appropriate to the choice of initiator may be employed advantageously.

Vulcanization or cure of the homopolymers or copolymers is accomplished by any of the numerous procedures presently employed in the vulcanization of natural and synthetic rubbery polymeric materials and with any of several of the known curing or vulcanization agents. The vulcanization may be carried out in the presence of various of the known fillers, antioxidants, etc.

The omega-cyanothiaalkyl acrylate monomers hereof are prepared by reacting, under condensation promoting conditions, an omega-cyanothiaalkanol with an acrylyl compound having a terminal alkoxy-replaceable group. That is, the said acrylyl compound has a group, connected to the carboxyl carbon, which is replaceable by a free alkoxy group, such as the omega-cyanothiaalkoxy group which becomes "free" upon displacement of the hydroxyl hydrogen from the omega-cyanothiaalkanol. The omega-cyanothiaalkanol thereby condenses with the acrylyl compound to provide the corresponding omega-cyanothiaalkyl acrylate and a condensation byproduct, viz the combined reaction product of the hydrogen atom displaced from the hydroxyl group of the omega-cyanothiaalkanol and the replaced terminal group of the acrylyl compound.

For example, the omega-cyanothiaalkanol may be reacted with an acrylyl halide, such as acrylyl chloride or acrylyl bromide, in the presence of an acid acceptor such as triethylamine, pyridine, or an inorganic base such as sodium carbonate, such reactions being preferably carried out at room temperature or below, although elevated temperatures may be employed. The omega-cyanothiaalkanol may also be reacted, preferably at elevated temperatures, with acrylic acid (acrylyl hydroxide) in the presence of an acidic catalyst such as sulfuric acid, p-toluene sulfonic acid, etc., or in the presence of a basic catalyst such as potassium hydroxide, sodium hydroxide, etc. Our omega-cyanothiaalkyl acrylates may also be prepared by ester interchange reaction between the omega-cyanothiaalkanol and a low molecular weight alkyl ester of acrylic acid, such as ethyl acrylate (acrylyl ethoxide) with or without the addition of an ester interchange catalyst. In the latter reaction, elevated temperatures, e.g. the reflux temperature of the reaction mixture, are preferably employed. These condensation reactions are typified by the following formula, which shows generally the preparation of 5-cyano-3-thiapentyl acrylate through condensation of 5-cyano-3-thiapentanol and acrylyl chloride, the condensation by-product being HCl.

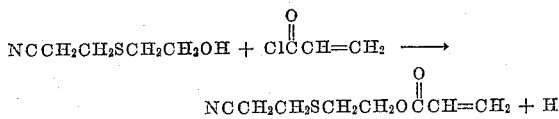

The omega-cyanothiaalkanol, in turn, is the double decomposition reaction product of an omega-chloroalkanenitrile and the sodium derivative of an omega-mercaptoalkanol, the reaction being carried out in the presence of a common solvent. The following reaction formula shows the reaction by which the 5-cyano-3-thiapentanol is prepared from beta-chloropropionitrile and the sodium derivative of mercaptoethanol:

In some instances the starting materials from which our novel omega-cyanothiaalkyl acrylates are prepared may not be readily available commercially. This is particularly true where omega-cyanothiaalkyl acrylates are desired having a large total number of carbon atoms in the hydrocarbon alkylene groups which flank the sulfur atom, e.g. where the total exceeds ten or fifteen or more carbon atoms. These starting compounds are, however, easily prepared in accordance with well-known procedures. For example, the omega-chloroalkanenitrile starting compounds employed in the preparation of the omega-cyanothiaalkanol intermediates are readily prepared from the corresponding glycols. Procedures by which these compounds may be prepared are set forth in "Organic Syntheses" Collective Vol. I (2d Edition) by Gilman and Blatt at pages 156 and 157 (including cross references). Generally, the preparations call for reaction of the glycol with a large excess of hydrochloric acid under conditions wherein the mono-chloro-substituted product is formed. The other hydroxyl is then replaced by a bromine atom upon reaction of the mono-chloro-substituted product with hydrobromic acid. The desired omega-chloroalkanenitrile is then obtained by reacting the bromochloroalkane product with a stoichiometric amount of potassium cyanide to thereby replace the bromine atom with a nitrile group.

The omega-mercaptoalkanols which we employ as starting compounds in the preparation of our novel omega-cyanothiaalkyl acrylates are also readily prepared in accordance with known procedures. They may, for example be prepared in accordance with the procedures set forth in an article by Clinton et al., appearing in the "Journal of the American Chemical Society," vol. 67, page 594 et seq. Generally these procedures call for the reaction of an omega-chloroalkanol (prepared according to the above-noted procedures) with thio-urea followed by hydrolysis of the reaction product under basic conditions to yield the desired omega-mercaptoalkanol.

Our invention will now be specifically illustrated and described with the aid of the several non-limitative examples which follow. Unless otherwise indicated ingredients will be listed as parts by weight.

Example I

To a 3-necked, round bottom, one liter flask equipped with a stirrer, reflux condenser and a dropping funnel (the latter two being protected with drying tubes) was added 400 cc. of absolute ethyl alcohol in which was dissolved 23 grams of sodium. The sodium was cut into small pieces and added to the alcohol cautiously a few pieces at a time to keep the solution process from becoming too vigorous. Seventy-eight grams of mercapto-ethanol was then added rapidly to the stirred contents to thereby form the sodium derivative of 2-mercaptoethanol.

The flask was then cooled in an ice bath. 4-cyano-3-thiabutanol was then formed by the addition of 75.5 grams of chloro acetonitrile to the flask in dropwise fashion over a period of about 40 minutes. Immediately upon the addition, a fine white precipitate of sodium chloride was seen to form. Upon completion of the reaction, the reaction mixture became neutral or very slightly acid (pH of about 6), at which time the precipitated sodium chloride was removed from the reaction mixture by filtration. The filtrate was then vacuum distilled under a pressure of about 3.5 mm. of mercury, the fraction boiling at 122–8° C. being retained. A yield of 79.9 grams of clear colorless 4-cyano-3-thiabutanol liquid was obtained.

A portion of the resulting intermediate, 19.8 grams, was then added to a cooled 500 cc. 3-necked round bottomed flask equipped with a stirrer, a reflux condenser and dropping funnel, the apparatus being sealed against moisture. Two hundred cc. of benzene and 18.8 grams of triethylamine were added. A solution of 16.0 grams of freshly distilled acrylyl chloride dissolved in about two volumes of benzene was then slowly added to the cooled flask while the contents were stirred. A precipitate of triethylamine hydrochloride was seen to form during the addition. Stirring was continued for about 2 hours after the addition was complete, after which the precipitate was removed by filtration. The filtrate was then washed first with 0.2 N hydrochloric acid, then with water, and dried by the addition of anhydrous magnesium sulfate. Vacuum distillation at a pressure of about 0.5 mm. mercury yielded 6.5 grams of the fraction boiling at 101–5° C., $n_D^{25}=1.5017$. Upon analysis the product was found to be 4-cyano-3-thiabutyl acrylate; it contained 49.5% C, 5.0% H, 7.99% N, 18.4% S (calculated analysis 49.7% C, 5.2% H, 8.09% N and 18.5% S).

The resulting monomer was clear, colorless and substantially odorless. It had a tendency to polymerize autogenously on storage at room temperature, as do substantially all of the monomers hereof. It was stabilized by holding under regfrigeration. The monomers may also be stabilized by the addition of hydroquinone or other polymerization inhibitors.

Example II 6-cyano-3-thiahexyl acrylate monomer was similarly prepared. The sodium derivative of 78 grams of 2-mercaptoethanol in 400 cc. of ethyl alcohol was reacted with 113.7 grams of gamma-chlorobutyronitrile. After removal of the precipitated sodium chloride by filtration, a liquid portion was vacuum distilled, the fraction boiling in the range 126–131° C. (about 0.5 mm. mercury pressure) being retained.

The acrylate monomer was then prepared by reacting, as above described, 54.3 grams of the resulting colorless 6-cyano-3-thiahexanol with 35.6 grams of acrylyl chloride in the presence of 500 cc. of benzene and 41.6 grams of triethylamine. The crude product was filtered, washed, and dried. It was further purified by passage through "Alcoa F–20" activated alumina and heated to drive off the remaining benzene. There remained 46 grams of 6-cyano-3-thiahexyl acrylate, a clear, essentially colorless and odorless liquid, B.P. 124–128° C. at about 0.5 mm. mercury pressure, $n_D^{23}=1.4979$. The analysis of the product was as follows: 54.4% C, 6.6% H, 6.86% N and 16.03% S; theoretical analysis was 54.2% C, 6.6% H, 7.03% N, 16.09% S.

Example III

In the preparation of the aforementioned 5-cyano-3-thiapentyl acrylate by the procedures hereof, 5-cyano-3-thiapentanol is first prepared in accordance with the procedures set forth in Example I. The sodium derivative of 187.4 grams of 2-mercaptoethanol is reacted with 214.8 grams of beta-chloropropionitrile in the presence of 1000 cc. of ethanol. The precipitate is then removed from the crude alkanol intermediate followed by vacuum distillation, the fraction boiling at 110–112° C. at a pressure of about 0.2 mm. of mercury being retained.

The desired acrylate monomer is then prepared by adding dropwise a solution of 143.2 grams of freshly distilled acrylyl chloride, dissolved in about twice its volume of benzene, to a cooled flask containing 196.8 grams of the clear colorless purified alkanol, 167 grams of triethylamine and approximately 1500 cc. of benzene. After filtration, the filtrate is washed and dried followed by purification of the crude product through distillation at 0.5 mm. mercury pressure.

The procedures described in the present example yielded 214 grams of the colorless clear 5-cyano-3-thiapentyl acrylate (boiling at 118–121° C. at about 0.5 mm. mercury pressure), the product analysis being 51.8% C, 5.8% H, 7.52% N and 17.3% S (theoretical analysis 51.9% C, 6.0% H, 7.56% N and 17.3% S).

Example IV

The sodium derivative of 92.2 grams of 3-mercapto-1-propanol is reacted in an ethanol medium with 89.5 grams of beta-chloropropionitrile in the manner above described in connection with Example I. The resulting crude 6-cyano-4-thiahexanol is then purified by vacuum distillation at a pressure of .25 mm. mercury, the fraction boiling at 114–118° C. being recovered.

The desired acrylate monomer is then prepared in the following manner: To a 500-cc., 3-necked, round bottom flask, equipped with a stirrer, reflux condenser, and dropping funnel, the latter two protected with drying tubes, is added 23.1 grams of 6-cyano-4-thiahexanol, 17.7 grams of triethylamine and about 250 cc. of benzene. To the stirred, ice-cooled solution is then added 15.1 grams of freshly distilled acrylyl chloride, diluted with about 30 cc. of benzene, dropwise over a period of about 50 minutes. Stirring is continued for about 4 hours. The precipitate of triethylamine hydrochloride is then removed by filtration and the benzene solution washed with 0.2 N hydrochloric acid solution followed by washing with water. After the resulting amber-colored solution has been dried over anhydrous magnesium sulfate, it is purified by passing it through "Alcoa F–20" activated alumina, after which the benzene is evaporated from the solution. These procedures yielded 18.3 grams of clear slightly yellow colored 6-cyano-4-thiahexyl acrylate, $n_D^{25}=1.4955$. Analysis showed the product to contain 54.5% C, 6.5% H, 6.92% N and 16.4% S (theoretical analysis 54.2% C, 6.6% H, 7.03% N and 16.1% S).

*Example V*

In the preparation of 8-cyano-7-thiaoctyl acrylate, the corresponding omega-cyanothiaalkanol is first prepared by reacting the sodium derivative of 53.7 grams of 6-mercapto-1-hexanol with 31.7 grams of chloroacetonitrile in the presence of approximately 180 cc. of absolute ethyl alcohol in the manner described in Example I. The 8-cyano-7-thiaoctanol intermediate is then separated by filtration therefrom of the precipitated sodium chloride followed by evaporation of the solvent.

The acrylate monomer is then prepared by adding dropwise a solution of 33.4 grams of acrylyl chloride dissolved in about 60 cc. of benzene to a cooled flask containing 60.8 grams of the 8-cyano-7-thiaoctanol, 400 cc. of benzene and 39.1 grams of triethylamine. After filtration, the filtrate is washed first with dilute hydrochloric acid then with water followed by purification of the crude product by passing it through "Alcoa F–20" activated alumina and evaporation of the remaining benzene. The procedures of this example yielded 52.1 grams of a faintly yellow liquid having a pleasant odor. The refractive index, $n_D^{26}$, was 1.4873. The product analysis was 58.7% C, 7.5% H, 6.09% N and 14.1% S (theoretical analysis 58.1% C, 7.5% H, 6.16% N and 14.1% S).

Our omega-cyanothiaalkyl acrylate monomers may be polymerized by any of the several known techniques of polymerization such as by mass, bulk or emulsion polymerization. The following examples represent preferred emulsion polymerization procedures which we have found to be suitable in the homopolymerization of our monomers.

*Example A*

| | Parts |
|---|---|
| Monomer | 100 |
| Water | 200 |
| Dodecylamine hydrochloride | 5 |
| Cumene hydroperoxide | 0.5 |
| Triethylenetetramine | 0.5 |

The ingredients are added to a flask which is then sealed in a nitrogen atmosphere and agitated (or stirred) continuously at a temperature of 0–10° C. Polymerization is generally complete in about 16 hours, the resulting polymer being of a very high molecular weight. The rubbery particles in the resulting latex may then be coagulated in accordance with known procedures, e.g. by lowering the pH of the dispersion through the addition of an acidic material such as potassium aluminum sulfate (alum) or by freeze coagulation.

*Example B*

| | Parts |
|---|---|
| Monomer | 100 |
| Water | 200 |
| Sodium lauryl sulfate (Duponol ME) | 5 |
| Sodium persulfate | 0.1 |
| Sodium metabisulfite | 0.1 |

The ingredients are added to a flask which is then sealed in a nitrogen (or other inert) atmosphere and agitated continuously at a slightly elevated temperature, e.g. about 50° C. The polymerization is complete within about 6–8 hours. The polymer is then coagulated as above shown.

The following example illustrates the preparation of a copolymer of one of our omega-cyanothiaalkyl acrylates with one or more other copolymerizable monomers.

*Example C*

| | Parts |
|---|---|
| 5-cyan-3-thiapentyl acrylate | 67 |
| Ethyl acrylate | 33 |
| Water | 180 |
| Sodium lauryl sulfate | 5 |
| Sodium persulfate | 0.3 |
| Sodium bisulfite | 0.1 |

The constituents are added to a flask which is then sealed in a nitrogen atmosphere and agitated continuously for about 3 hours in a water bath having a temperature of about 50° C. The polymer is then precipitated from the latex such as, for example, by the addition of about two volumes of methanol. The precipitated polymer is then washed with water.

The polymers thus obtained may then be cured or vulcanized by any of several well-known curing procedures customarily employed in the cure of synthetic polymeric materials. The following example illustrates one such cure recipe.

*Example D*

| | Parts |
|---|---|
| Polymer | 100 |
| Carbon black | 32 |
| Stearic acid | 1 |
| MgO | 6.5 |
| $PbO_2$ | 1.6 |

The polymer and the remaining ingredients are thoroughly compounded on a standard cold differential-roll rubber mill and then cured at elevated temperatures, for example, at a temperature of 310° F. for 50 minutes in the case of homopolymerized 5-cyano-3-thiapentyl acrylate.

Cured polymers having highly satisfactory rubbery properties result. Elastic recovery properties (absence of permanent deformation) in particular are excellent. The following tensile strength data (room temperature), obtained from 5-cyano-3-thiapentyl acrylate, homopolymerized and copolymerized in accordance with Examples A and C, respectively, and cured as described in Example D, is representative of preferred polymers of the present invention. The test samples were small and dumbell shaped. Neck dimensions of the samples were 0.05" x 0.125".

| Test | Homopolymer | Copolymer |
|---|---|---|
| Tensile strength _____ p.s.i. | 750 | 900 |
| Total elongation at break _____ percent | 120 | 390 |
| Permanent deformation at break ____ do | 0 | negligible |

Test specimens of cured polymerization products of several of the monomers of the preceding numbered examples were subjected to several tests in order to determine the low temperature flexibility and solvent resistance characteristics thereof. The homopolymers tested had been polymerized and cured in accordance with Examples A and D, respectively. The copolymer had been prepared and cured as described in Examples C and D, respectively. The glass temperature ($Tg$), the temperature at which the polymer changes from a glassy or brittle condition to a rubbery condition (see: Flory, "Principles of Polymer Chemistry"), and the Gehman Torsional $T_{10}$ were determined, the latter in accordance with American Society for Testing Materials Procedure D1053–54T. These tests demonstrate the low temperature flexibility characteristics. Resistance of the samples to the solvents shown was determined pursuant to ASTM Procedure D471–54T. The following table represents the compilation of the test results.

| Composition Tested | $Tg$ (° C.) | $T_{10}$ (° C.) | Volumn Percent Swell After Immersion for at least 72 hours, at 25° C, in — | | |
|---|---|---|---|---|---|
| The Cured polymerized omega-cyanothiaalkyl acrylate product of— | | | Benzene | Iso-octane-Toluene (70/30) | "Skydrol" [2] |
| Homopolymer of Example I | −24 | −5.5 | 14.0 | 2.0 | 1.0 |
| Homopolymer of Example II | −58 | | 38 | 7.0 | 5.0 |
| Homopolymer of Example III | −50 | −18 | 19.5 | 4.0 | 0.4 |
| Homopolymer of Example IV | −58 | −20 | 42 | 6.0 | 3.0 |
| Homopolymer of Example V | −59 | −29.5 | 120 | 16.5 | 56 |
| Copolymer of Example C | | −9 | 80 | 7.1 | 6.2 |
| Standard [1] | | −10 | 213 | 67 | 97 |

[1] Cured 85:15 butyl acrylate-acrylonitrile copolymer.
[2] An ester base hydraulic fluid.

Thus it will be seen that all of the omega-cyano-thiaalikyl acrylate monomers of the preceding examples homopolymerize and copolymerize to form highly solvent resistant rubbery polymers having excellent low temperature flexibility characteristics. These monomers, wherein the total number of carbon atoms in the two alkylene groups equal from 3 to 7, represent preferred polymerizable constituents of the present invention. However, these monomers by no means represent the only ones which polymerize to a solvent resistant and flexible state. Omega-cyanothiaalkyl acrylate monomers having total numbers of carbon atoms in the two alkylene groups well in excess of those contained in the monomers of the preceding examples may be homopolymerized to form satisfactory rubbery materials. However, polymers formed from monomers having relatively short alkylene group chain lengths are somewhat superior in strength and low temperature flexibility to polymers formed from monomers having greater numbers of carbon atoms in the alkylene groups. Similarly, solvent resistance of polymers formed with monomers having relatively short alkylene chain lengths is somewhat superior to that of polymers having greater numbers of carbon atoms in the alkylene groups. This latter tendency is apparently due to the increased molecular dilution of the sulfur atom and nitrile group in the molecule. A total number of carbons in the said alkylene groups equalling about 13 represents the maximum number consistent with the formation of satisfactory rubber polymers.

The relative position of the sulfur atom in the omega-cyanoakyl chain is relatively unimportant insofar as the low temperature and solvent resistance characteristics of the resulting polymers are concerned. In fact, we have noted very little difference, with respect to these properties, in homopolymers having identical total numbers of carbon atoms in the two alkylene groups but in which the numbers in corresponding groups differ. It will be noted, however, that all of the omega-cyanothiaalkyl acrylate monomers hereof have a structure such that the sulfur atom is positioned at least two carbon atoms removed from the ether oxygen of the ester group, i.e., at least two carbon atoms removed from the acryloxy group, and at least one carbon atom removed from the nitrile group.

The omega-cyanothiaalkyl acrylates of the present invention are not limited to the omega-cyanothiaalkanol esters of acrylic acid. Esters of derivatives of acrylic acid similarly provide the advantageous monomer products herein described. For example, by employing methacrylyl compounds in place of the acrylyl compounds in the preparation of the monomers described in the preceding examples, corresponding omega-cyanothiaalkyl methacrylates are prepared. These derivatives also demonstrate high utility when polymerized to form elastomers. However, low temperature flexibility and solvent resistance characteristics, though still highly satisfactory, are generally not the equal of the corresponding esters of acrylic acid. Other derivatives of acrylic acid, such as the halogen derivatives, likewise yield corresponding omega-cyanothiaalkyl α-haloacrylates. Further, the alkylene groups of our acrylates may contain some branch chain constituents without materially adversely affecting the products.

Our novel monomers, including those suitable for polymerization to rubbery polymers as well as those having greater total numbers of carbon atoms in the two alkylene groups, e.g. those in which the total exceeds 15 or 20 or more carbon atoms, are suited for use as germicides, insecticides and the like. Being non-odorous and substantially non-toxic to human beings, they are particularly suited to hand spraying and other operations where the individual may be subjected to exposure. However, care should be taken that the compounds are employed in monomeric and not polymeric form, the latter being so insoluble as to be ineffective. Therefore, where omega-cyanothiaalkyl acrylate monomers are used which are per se somewhat unstable at temperatures apt to be encountered during application, polymerization inhibitors, such as hydroquinone, p-tertiary-butyl catechol and the like should be included.

Herein we have described a novel class of chemical compounds, namely omega-cyanothiaalkyl acrylates. We have described the novel rubbery polymer products obtained by the homo- and co-polymerization of certain of the omega-cyanothiaalkyl acrylate monomers. In describing our invention reference has been made to specific uses for which the various products of the present invention are especially suited. Also described both generally and specifically have been the novel procedures by which our omega-cyanothiaalkyl acrylate compounds are prepared. It is to be borne in mind, however, that these descriptions and examples have been presented in order to describe and illustrate our invention, not to limit it. It is rather our intent to be limited only by the specification taken as a whole, including the appended claims.

We claim:

1. A rubbery homopolymer of an omega-cyanothiaalkyl acrylate, the sulfur atom being at least two carbon atoms removed from the acryloxy group and at least one carbon atom removed from the nitrile group, the two alkylene groups containing a total of from 3 to about 13 carbon atoms.

2. A rubbery homopolymer of an omega-cyanothiaalkyl acrylate, the sulfur atom being at least two carbon atoms removed from the acryloxy group and at least one carbon atom removed from the nitrile group, the two alkylene groups containing a total of from 3 to about 7 carbon atoms.

3. Rubbery homopolymeric 5-cyano-3-thiapentyl acrylate.

4. A rubbery copolymer of a member selected from acrylic acid and alkyl acrylates, and an omega-cyanothiaalkyl acrylate, in the latter the sulfur atom being at least two carbon atoms removed from the acryloxy group and at least one carbon atom removed from the nitrile group with the two alkylene groups containing a total of from 3 to about 7 carbon atoms.

5. A rubbery copolymer of ethyl acrylate and an omega-cyanothiaalkyl acrylate, in the latter the sulfur atom being at least two carbon atoms removed from the acryloxy group and at least one carbon atom removed from the nitrile group with the two alkylene groups containing a total of from 3 to about 13 carbon atoms.

6. A rubbery copolymer of ethyl acrylate and an omega-cyanothiaalkyl acrylate, in the latter the sulfur atom being at least two carbon atoms removed from the acryloxy group and at least one carbon atom removed from the nitrile group with the two alkylene groups containing a total of from 3 to about 7 carbon atoms.

7. A rubbery copolymer of ethyl acrylate and 5-cyano-3-thiapentyl acrylate.

References Cited in the file of this patent

UNITED STATES PATENTS

| | | |
|---|---|---|
| 2,645,659 | Morris et al. | July 14, 1953 |
| 2,720,512 | Butler | Oct. 11, 1955 |